Dec. 4, 1945. F. HOPPER 2,390,369
STRIPPING MACHINE
Filed Feb. 7, 1944 2 Sheets-Sheet 1

INVENTOR,
Floyd Hopper,
BY John W. Steward,
ATTORNEY.

Dec. 4, 1945. F. HOPPER 2,390,369
STRIPPING MACHINE
Filed Feb. 7, 1944 2 Sheets-Sheet 2
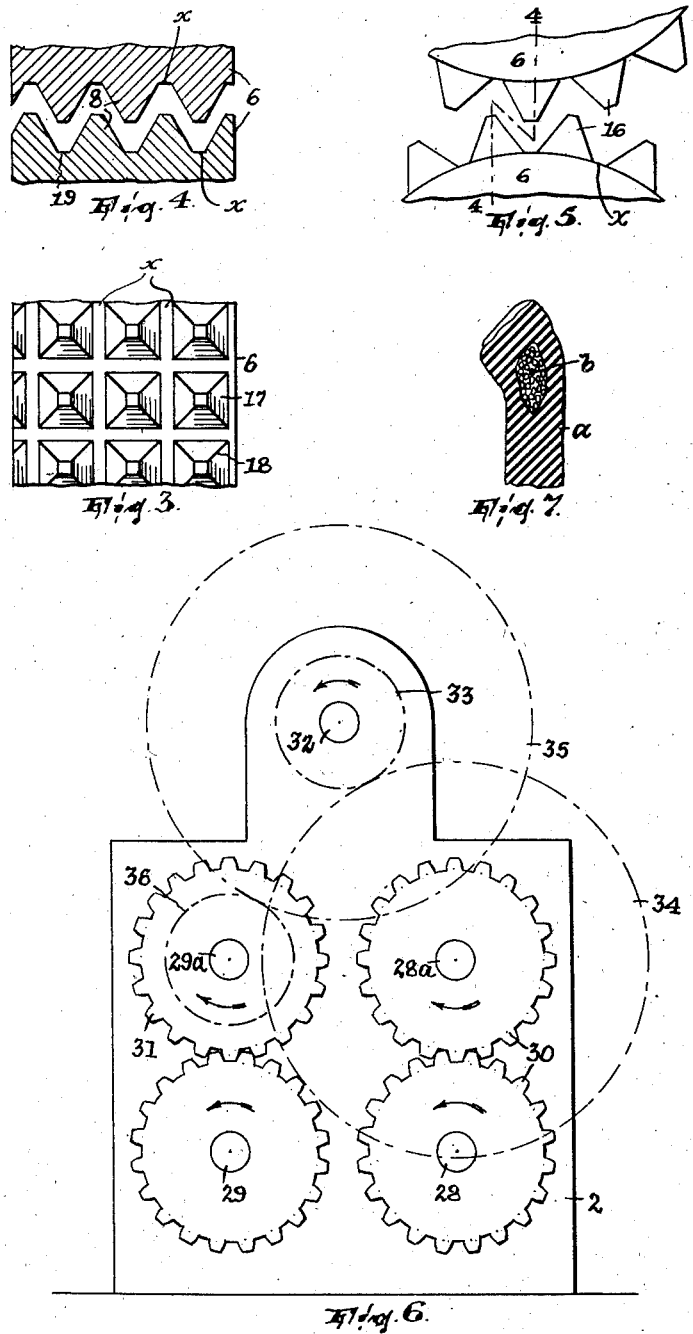
INVENTOR,
Floyd Hopper,
BY John W. Steward,
ATTORNEY.

Patented Dec. 4, 1945

2,390,369

UNITED STATES PATENT OFFICE 2,390,369

STRIPPING MACHINE

Floyd Hopper, Paterson, N. J.

Application February 7, 1944, Serial No. 521,484

2 Claims. (Cl. 81—9.51)

This invention relates to machines for separating pliable plastic material, as rubber, from a wire or other hard, tough core which it encases, and it has particularly in view the provision of a machine which will be effective to accomplish the separation when said material is exceedingly tough and adheres very tenaciously to the core, as in the case of the bead of a pneumatic tire comprising a rubber and canvas or duck carcass and a core existing as a cable composed of a number of wires, usually twisted and frequently braided.

My object has been to provide a machine which will effect the separation not only quickly but also quite completely and with substantially complete avoidance of disruption of the core, whereby the very maximum of the rubber or equivalent may be reclaimed and the cores remain usually in their initial unitary state and so have a usefulness that they would not have if cut or broken into fragments.

Generally stated, the invention contemplates at least two pairs of rough-ribbed manglers, the pairs being arranged to receive in succession the "work" (existing in the form of what I hereinafter term a strip) between their members, and means to rotate said pairs in the direction to advance the work lengthwise of itself but the relatively aft pair at a speed superior to that of the preceding pair. The peripheries of the manglers being ribbed and in some way roughened transversely, but preferably as hereinafter particularly set forth, stripping of the pliable material from the core results even if the manglers of either pair rotate at the same speed. Other features of the invention and consequent desirable results will be hereinafter set forth.

In the drawings,

Fig. 3 is an enlarged fragmentary view of the periphery of one of the manglers;

Fig. 4 is a transverse section of the adjoining portions of a pair of the manglers, on line 4—4, Fig. 5;

Fig. 5 is a view of such portions in side elevation;

Fig. 6 is a side elevation of a modified form of the machine; and,

Fig. 7 is a cross-section of a tire bead detached from the tire.

In Fig. 7, $a$ is the pliable portion of the bead of a pneumatic tire, taken as comprising as usual rubber and duck, and $b$ is the cable of wires, twisted or braided, forming the bead core. The bead, having been severed from the tire, is cut transversely so that it no longer exists in endless form but as what I term a strip and so may be fed lengthwise of itself to the machine.

Figure 1:
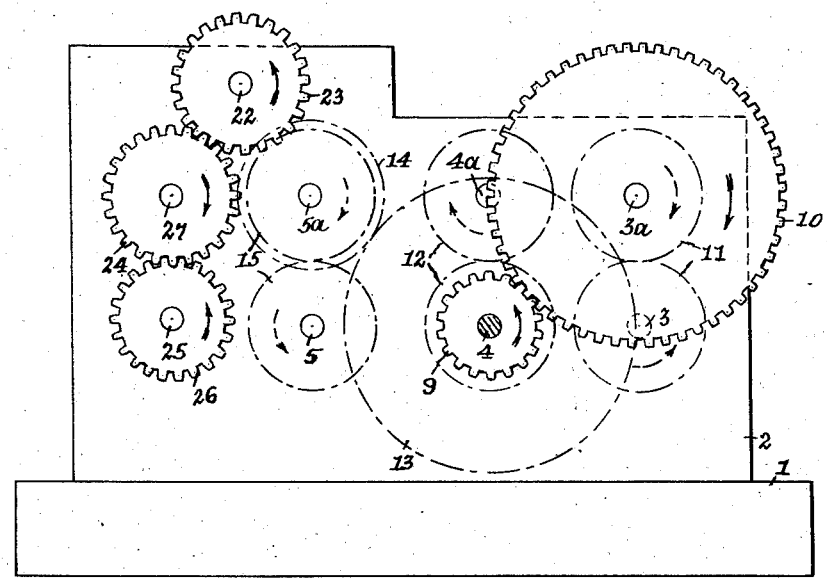
Fig. 1 is a side elevation of the preferred form of the machine.
Figure 2:
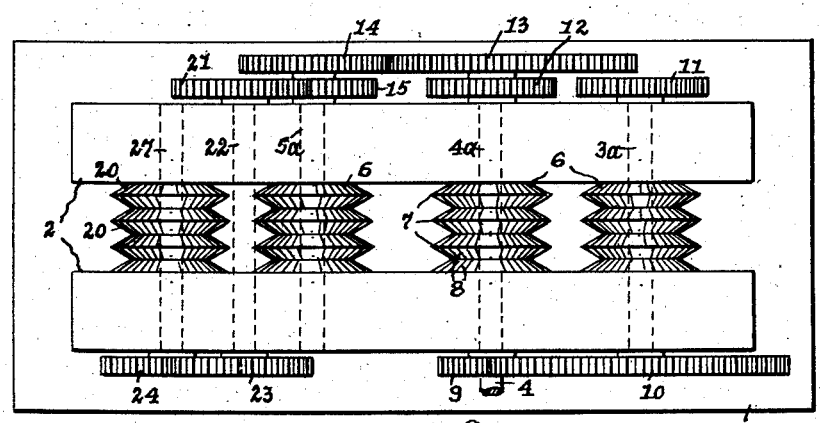
Fig. 2 is a plan thereof.

In Figs. 1 and 2 let 1 be a suitable bed on which is fixed a pair of parallel uprights 2 to provide bearings for the rotary elements of the machine. In the present case the work is to be fed to the machine from the right in these views.

At 3—3a, 4—4a and 5—5a are journaled in the uprights pairs of superposed parallel shafts, the shafts 3, 4 and 5 being in a plane below and parallel to that of shafts 3a, 4a and 5a, and all the shafts having fixed thereto generally cylindrical manglers 6. The manglers on any one pair of these shafts have circumferential ribs 7 and the thus-ribbed peripheries of such manglers mesh with each other as shown in Fig. 4, in the sense that the ribs of either extend between the ribs of the other, but so that the nips of the two manglers are spaced transversely, this spacing being in any event less than preferably the minimum thickness of the work to be treated. The ribs are all roughened in some way transversely, as schematically indicated at 8 in Fig. 2, but preferably as will hereinafter be particularly set forth and as shown by Figs. 3 to 5. The spacing of the manglers of any aft pair is at least not greater than the spacing of those of the next preceding pair.

The pairs of manglers are to be rotated at successively increasing speeds, for instance as follows, assuming shaft 4 to be driven, as by a motor: A small gear 9 fixed on said shaft meshes with a large gear 10 fixed on the shaft 3a and shafts 3—3a have (at the far side of the machine) intermeshing gears 11 of equal diameter so that the first pair of manglers will be rotated at the same speed. On the far ends of shafts 4—4a are fixed intermeshing gears 12 of the same diameter so that the second pair of manglers will be rotated at the same speed—but, due to the gearing 9—10, at a faster speed than the first pair of manglers. On the far end of shaft 4 is fixed a large gear 13 which meshes with a gear 14 fixed on the shaft 5a. And on the far ends of shafts 5—5a are fixed intermeshing gears 15, wherefore, while the manglers of the third pair rotate at the same speed, due to gearing 13—14 they are rotated at a faster speed than the second pair. The arrows indicate the directions of rotation of the manglers.

Consider the machine as so far described, or generally as follows: There are successive pairs of rotary manglers; those of each pair have circumferential ribs and the ribs of either such mangler extend between those of the other mangler and are roughened transversely; the manglers of each pair are spaced from each other, to wit, at their nips and transversely; and there is means, as the described gearing, to rotate the manglers so that all their nip portions move in one direction of a line (here a straight line) extending between the manglers of each pair and so that the manglers of a pair prior in order are rotated at a speed less than that of the manglers of the pair next in order in said direction. If, therefore, the work be delivered lengthwise of itself to the first or right-hand pair of manglers it will be thereby delivered to the second pair, and by the second pair it will be delivered to the third pair. And while the work is being thus advanced between the successive pairs stripping of the carcass from the core will ensue as an incident of the roughening of the peripheries of the manglers, taken with the opposing forces active as regards any two adjoining pairs, to wit, the resistance of the preceding pair to advance of the work by the aft pair at the rate of advance the latter tends to maintain. By providing the manglers with circumferential ribs that are crosssectionally tapered, as shown, the stripping is made to occur completely around the core. As will appear hereinafter, it is not essential that there be more than two pairs of manglers.

If the strip constituting the work is the conventional tire bead, to wit, having a carcass which is exceedingly tough and tenacious, I find that the peripheries of the manglers should be formed roughened in a particular way so that the mangling and stripping action will be effective and the core will depart from the operation having the carcass substantially if not quite completely removed therefrom. To this end the roughening of said peripheries is as follows: The periphery of each mangler is not only ribbed circumferentially with the ribs tapered, as already indicated, but is also ribbed transversely, as at 16 in Fig. 5, whereby each rib (whether of the circumferential or transverse class) develops as a series of projections or teeth 17. But, whereas the resulting toothed circumferential ribs of one mangler of any pair extend between the corresponding ribs of the other such mangler (Fig. 4) so the toothed transverse ribs of one such mangler may extend between the corresponding ribs of the other mangler at the nip portions of the manglers (Fig. 5), although such is not material. Since all the ribs, both circumferential and transverse, preferably taper the teeth exist in tapering or pyramid form, with preferably sharp edges 18. On the whole, therefore, the peripheries of the manglers of any pair not only effectively grip the work but their teeth actually cut into the carcass. Further, no undue distortion of the core, such as would result in its being cut or disrupted, occurs because the work generally lies in a groove, as 19, between two of the circumferentially toothed ribs of one mangler. An important feature of my invention resides in the fact that the inward convergence of the adjacent sides of adjoining ribs is not complete or developed substantially to a point but terminates at the perimeter $x$ (Figs. 3 and 4) of the manglers. In other words, the ribs are spaced at their bases so that at $x$ a perimetrical surface, as distinguished from a crotch, provides an abutment for the work that is positive in character, thus insuring effective stripping action by the complementary manglers.

Conceivably, with the manglers of successive pairs rotated at successively increasing speeds, there might be good if not complete stripping even if there were only two pairs of manglers, provided the carcass is relatively weak and is but weakly bonded to the bead. But where the carcass is relatively tough and strongly bonded to the bead I have found it desirable to provide an additional pair of manglers, as on shafts 5—5a. And even with such three pairs of manglers or more, in some cases the work is so resistant to stripping that complete removal of the carcass is not accomplished, or this further condition occasionally may ensue, to wit: the traction as to the second and third pairs having been reduced by the stripping, the trailing end portion of the bead passes between the series of mangler pairs with the carcass more or less intact or not stripped away, though perhaps mangled. I have found in practice that these conditions may be eliminated if a final pair of manglers is provided the members of which rotate at differential speeds; this rotation at differential speeds involves, per se, stripping, or a stripping action different from that incident to rotating one pair of manglers faster than the preceding pair. (I apply the differential speed to the final pair of manglers, only, because I find that the wire core occasionally is caused to wind around one of the manglers of the differentially rotated pair, which would leave it inaccessible if such pair were not the final one.)

Accordingly, in Fig. 2, 20 designates the manglers of the said final pair, identical to those already described, and these are rotated as follows: A gear 21 on a shaft 22 meshes with the gear 15 and on such shaft is also a gear 23 which meshes with a gear 24 on the shaft 27 of the upper mangler 20, which gear 24 meshes with a gear 26 on the shaft 25 of the lower mangler 20, gears 23 and 24 being of the same diameter as the gears 15, 12 and 11 but gear 26 being of smaller diameter.

Fig. 6 shows a construction in which there are only two pairs of manglers but the second (or left-hand pair) rotated at an appreciably higher speed relatively to that of the first pair than in the case of the first and second pairs in Figs. 1 and 2. The manglers, not appearing, are assumed to be the same as already described, the first pair being fixed on shafts 28—28a and the second pair fixed on shafts 29—29a journaled in the uprights 2. 30 is the intermeshing gears fixed on shafts 28—28a and 31 the intermeshing gears fixed on shafts 29—29a. On a counter-shaft 32, constituting the drive shaft in this case, are fixed a gear 33, which meshes with a large gear 34 fixed on shaft 28a, and a large gear 35, which meshes with a small gear 36 on shaft 29a.

Having thus fully described my invention, what I claim is:

1. In a machine for removing the carcass from a coated core, the combination of supporting means, successive pairs of spaced rotary manglers journaled therein and the manglers of each pair having circumferential ribs and the ribs of each mangler in each pair extending between the ribs of the other such mangler and the ribs of all the manglers being roughened in a direction transversely of the ribs, and means to rotate the manglers so that the nip portions of all the manglers move in one direction of a line extending between the nips of each pair and so that the manglers of the relatively aft pair rotate at differential speeds and the more slowly rotated mangler of such pair rotates at a peripheral speed not less than the speed of approach of the coated core to such pair.

2. In a machine for removing the carcase from a coated core, the combination of supporting means, several successive pairs of spaced rotary manglers journaled therein and the manglers of each pair having circumferential ribs and the ribs of each mangler in each pair extending between the ribs of the other such mangler and the ribs of all the manglers being roughened in a direction transversely of the ribs, and means to rotate the manglers so that the nip portions of all the manglers move in one direction of a line extending between the nips of each pair and so that the manglers of the last pair rotate at differential speeds and the more slowly rotated mangler of such pair rotates at a peripheral speed not less than the speed of approach of the coated core to such pair.

FLOYD HOPPER.